United States Patent
Bondarenko et al.

(10) Patent No.: US 11,853,220 B2
(45) Date of Patent: Dec. 26, 2023

(54) PREFETCHER TRAINING

(71) Applicant: Arm Limited, Cambridge (GB)

(72) Inventors: Natalya Bondarenko, Antibes (FR); Stefano Ghiggini, Antibes (FR); Damien Matthieu Valentin Cathrine, Mougins (FR); Ugo Castorina, Antibes (FR)

(73) Assignee: Arm Limited, Cambridge (GB)

( * ) Notice: Subject to any disclaimer, the term of this patent is extended or adjusted under 35 U.S.C. 154(b) by 64 days.

(21) Appl. No.: 17/501,272

(22) Filed: Oct. 14, 2021

(65) Prior Publication Data

US 2023/0121686 A1 Apr. 20, 2023

(51) Int. Cl.
G06F 12/0862 (2016.01)
G06F 12/0891 (2016.01)
G06F 13/16 (2006.01)
G06F 12/02 (2006.01)
G06F 18/214 (2023.01)

(52) U.S. Cl.
CPC ...... *G06F 12/0862* (2013.01); *G06F 12/0238* (2013.01); *G06F 12/0891* (2013.01); *G06F 13/1621* (2013.01); *G06F 13/1668* (2013.01); *G06F 18/214* (2023.01)

(58) Field of Classification Search
None
See application file for complete search history.

(56) References Cited

U.S. PATENT DOCUMENTS

| 10,101,917 B1* | 10/2018 | Agans | G06F 11/3457 |
| 2002/0087802 A1* | 7/2002 | Al-Dajani | G06F 9/3455 |
| | | | 711/204 |
| 2009/0006813 A1* | 1/2009 | Singhal | G06F 9/383 |
| | | | 712/207 |
| 2009/0019229 A1* | 1/2009 | Morrow | G06F 12/0862 |
| | | | 711/137 |

\* cited by examiner

*Primary Examiner* — Charles J Choi
(74) *Attorney, Agent, or Firm* — NIXON & VANDERHYE P.C.

(57) ABSTRACT

An apparatus comprises a cache to store information, items of information in the cache being associated with addresses; cache lookup circuitry to perform lookups in the cache; and a prefetcher to prefetch items of information into the cache in advance of an access request being received for said items of information. The prefetcher selects addresses to train the prefetcher. In response to determining that a cache lookup specifying a given address has resulted in a hit and determining that a cache lookup previously performed in response to a prefetch request issued by the prefetcher for the given address resulted in a hit, the prefetcher selects the given address as an address to be used to train the prefetcher.

15 Claims, 8 Drawing Sheets

| | 6 | 7 | 8 |
|---|---|---|---|
| | Address tag | Information | Pf flag |
| 5 | | | |
| 5 | | | |
| | | | |
| | | | |
| | | | |

FIG. 2

| | 6 | 7 | 8 | 10 |
|---|---|---|---|---|
| | Address tag | Information | Pf flag | Redundant |
| 5 | | | | |
| 5 | | | | |
| | | | | |
| | | | | |
| | | | | |

FIG. 3

PREFETCHER TRAINING

BACKGROUND

Technical Field

The present technique relates to the field of data processing.

Technical Background

Many data processing systems provide caches, in which information such as data and instructions can be stored. Caches provide storage that is quicker to access than memory. However, if a cache does not hold a copy of information that is requested from the cache, then the data is usually retrieved from a further level of cache or memory, which can slow down the access request. A prefetcher may be provided to reduce the probability that an access request misses in the cache, by predicting future access requests and prefetching information into the cache in advance of receiving an access request for the information. Prefetcher coverage is one of the main characteristics of prefetcher performance. It is defined as the portion of total cache misses that have been avoided due to the prefetcher. It is desirable to improve prefetcher coverage.

SUMMARY

Viewed from one aspect, the present technique provides an apparatus, comprising:
- a cache configured to store information, items of information in the cache associated with addresses;
- cache lookup circuitry configured to perform lookups in the cache; and
- a prefetcher configured to prefetch items of information into the cache in advance of an access request being received for said items of information,
- wherein the prefetcher is configured to select addresses to train the prefetcher, and
- in response to determining that a cache lookup specifying a given address has resulted in a hit and determining that a cache lookup previously performed in response to a prefetch request issued by the prefetcher for the given address resulted in a hit, the prefetcher is configured to select the given address as an address to be used to train the prefetcher.

Viewed from another aspect, the present technique provides a method, comprising:
- storing information in a cache, items of information in the cache associated with addresses;
- prefetching, with a prefetcher, items of information into the cache in advance of an access request being received for said items of information,
- selecting, with the prefetcher, addresses to train the prefetcher, and
- in response to determining that a cache lookup specifying a given address has resulted in a hit and determining that a cache lookup previously performed in response to a prefetch request issued by the prefetcher for the given address resulted in a hit, selecting, with the prefetcher, the given address as an address to be used to train the prefetcher.

Viewed from yet another aspect, the present technique provides a non-transitory computer-readable medium to store computer-readable code for fabrication of an apparatus comprising:
- a cache configured to store information, items of information in the cache associated with addresses;
- cache lookup circuitry configured to perform lookups in the cache;
- a prefetcher configured to prefetch items of information into the cache in advance of an access request being received for said items of information,
- wherein the prefetcher is configured to select addresses to train the prefetcher, and
- in response to determining that a cache lookup specifying a given address has resulted in a hit and determining that a cache lookup previously performed in response to a prefetch request issued by the prefetcher for the given address resulted in a hit, the prefetcher is configured to select the given address as an address to be used to train the prefetcher.

Further aspects, features and advantages of the present technique will be apparent from the following description of examples, which is to be read in conjunction with the accompanying drawings.

BRIEF DESCRIPTION OF THE DRAWINGS

FIG. 2 illustrates a table describing information associated with entries in a cache.

FIG. 3 illustrates a table describing information associated with entries in a cache, including a redundant prefetch indicator.

DESCRIPTION OF EXAMPLES

Figure 1:
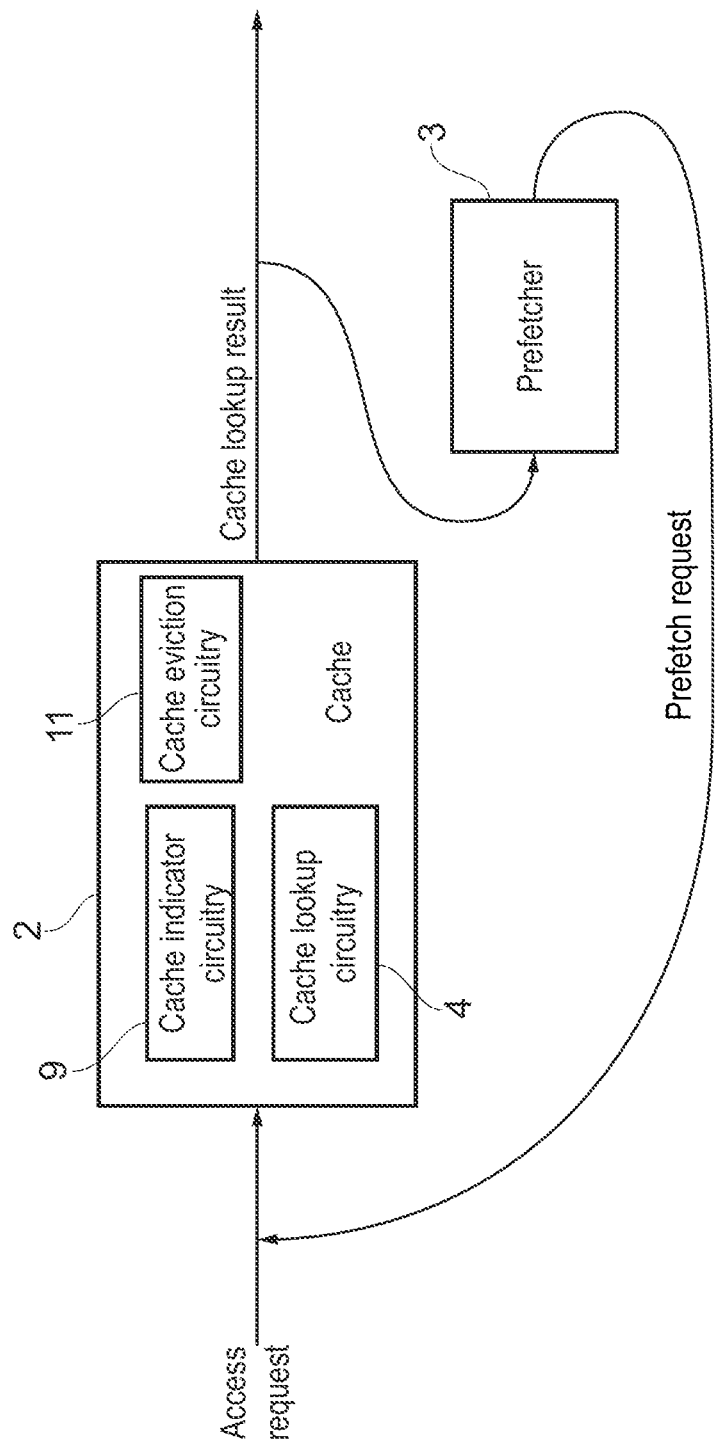
FIG. 1 illustrates a schematic diagram of a system including a cache and a prefetcher.

A data processing apparatus may comprise at least one cache. A cache can be used to store information in order to access that information more quickly than if it were stored only in memory. The information is not particularly limited, and may for example include data and instructions to be accessed by the data processing apparatus. Items of information in the cache can be associated with addresses, such that an access request to the cache can specify an address to request that information associated with the address is returned in response to the access request. The apparatus may also comprise cache lookup circuitry. The cache lookup circuitry can be configured to perform lookups in the cache, searching the cache for a particular item of information. A cache lookup can be performed in response to, among other things, an access request and a prefetch request. The cache lookup circuitry may use the whole or part of an address to perform the cache lookup. If a cache lookup performed in response to an access request misses, this means that the cache does not hold a copy of the requested information, and the requested information may be retrieved from a further level of cache or from memory, which introduces a delay and slows down the access request, potentially impacting performance of the data processing apparatus. A prefetcher can be used to reduce the likelihood of a cache miss by prefetching items of information into the cache in advance of an access request being received for said items of information. The prefetcher may predict future access requests, and prefetch items of information based on the predictions. By prefetching items of information in advance of an access request being received for the information, the latency associated with fetching the information can be hidden. In order for the prefetcher to be able to predict future access requests, the prefetcher is trained on addresses corresponding to cache lookups, including addresses specified in access requests that are issued by the data processing apparatus and/or addresses specified in prefetch requests. However, it has been found that training a prefetcher using every single address corresponding to a cache lookup has certain drawbacks. In particular, training on every address specified in a cache lookup can lead to a large number of redundant prefetch requests being issued, where a redundant prefetch request is a prefetch request for information that already resides in the cache. Therefore, the prefetcher can be configured to select addresses specified in certain cache lookups to be used to train the prefetcher, rather than using every address. This may be referred to as input stream filtering.

One technique to select addresses to train the prefetcher involves training the prefetcher using an address when the address is associated with a cache lookup that has resulted in a cache miss, and additionally using an address when it is associated with a cache lookup that has hit on a previously prefetched line that has not been accessed since being prefetched.

However, the inventors have recognised that this scheme does not take into account certain situations, and have proposed an alternative technique to increase prefetcher coverage. In particular, the technique described above does not account for information structures that have been prefetched into the cache, read at least once, and partially evicted. The addresses of the information that remains in the cache are not selected to train the prefetcher using the above technique, and therefore could cause reduced prefetcher coverage due to "holes" in address sequences that are not supplied for training because of the corresponding cache lookup hitting in the cache. This problem will be discussed in greater detail below.

In the proposed technique, the prefetcher is configured to select a given address to train the prefetcher in response to determining that a cache lookup performed for the given address hits in the cache and determining that a cache lookup that has previously been performed in response to a prefetch request issued by the prefetcher for the given address resulted in a hit. By selecting addresses in this way, the prefetcher can select addresses for training that have been found in a cache lookup to encounter a hit in the cache when they have also previously been specified in a prefetch request which hit in the cache. Selecting these addresses for training can improve prefetcher coverage because it means that "holes" in patterns of accessed addresses (caused by some portions of a previously cached data structure remaining in the cache after other portions have been partially evicted) can be filled in the training stream, providing a more stable training stream when there are partially evicted information structures in the cache, as will be discussed below.

The prefetcher may determine that a cache lookup previously performed in response to a prefetch request issued by the prefetcher for the given address resulted in a hit in several different ways. For example, a buffer could be provided, and when a cache lookup is performed in response to a prefetch request and hits, an address corresponding to the prefetch request could be stored in the buffer. The prefetcher could determine whether a cache lookup previously performed in response to a prefetch request issued by the prefetcher for the given address resulted in a hit by comparing the given address to the addresses stored in the buffer.

In another example, the data processing apparatus may comprise cache indicator circuitry configured to set a redundant prefetch indicator for information in the cache associated with an address for which a cache lookup performed in response to a prefetch request issued by the prefetcher results in a hit. The redundant prefetch indicator could be stored in the cache with the cache information for which the cache lookup hit. In some examples, the redundant prefetch indicator could be stored alongside the other cache metadata for the particular cache entry. However, in another example the redundant prefetch indicator could be stored in a separate structure, separate from the cache comprising the information associated with the address. In any case, the prefetcher can be configured to determine, for a given address associated with information in the cache, whether a cache lookup previously performed in response to a prefetch request for the given address resulted in a hit using a redundant prefetch indicator. For example, this can be determined by checking the status of the redundant prefetch indicator associated with the entry of the cache associated with the given address.

In some examples, the redundant prefetch indicator may be encoded in spare encodings of other information associated with a cache entry. For example, information in the cache may be associated with replacement policy information, and/or coherency state information, which may encoded in bits with spare encoding space that can be used to encode the redundant prefetch indicator. Alternatively, there could be bits dedicated to providing a redundant prefetch indicator flag associated with information in the cache. This could be any number of bits, but a particularly efficient example uses one bit to encode a redundant prefetch indicator as a flag. In one state, the flag can indicate that the flag is associated with information in the cache associated with an address for which a cache lookup performed in response to a prefetch request issued by the prefetcher resulted in a hit, and in another state the flag can indicate that this is not the case.

The redundant prefetch indicator or other indication of an address of a prefetch request for which the result lookup resulted in a hit can be cleared or invalidated when the corresponding information is evicted or invalidated from the cache. Hence, in the detection of whether a cache lookup was "previously" performed in response to a prefetch request resulting in a hit for the given address, "previously" may refer to any time in the period between a time when the corresponding information associated with the given address was previously allocated to the cache and the current time at which the hit was detected for the cache lookup specifying the given address.

Information in the cache may also be associated with a prefetched indicator (pf_flag). The cache indicator circuitry may set the prefetched indicator for information in the cache that has been prefetched by the prefetcher. The cache indicator circuitry may then clear the prefetched indicator when the information in the cache that has been prefetched by the prefetcher is accessed for the first time after being prefetched. The prefetched indicator can therefore indicate that the information in the cache associated with the prefetched indicator has been prefetched by the prefetcher and has not been accessed in response to an access request since being prefetched.

The prefetched indicator is independent from the redundant prefetch indicator, which indicates that the information was present in the cache when a lookup performed in response to a prefetch request hit against that information (indicating that the prefetch would be redundant). A given item of information in the cache can be associated with either, both, or neither of the prefetched indicator and redundant prefetch indicator.

In some examples, the prefetched indicator (pf_flag) may be used to select addresses to train the prefetcher. In a particular example, in response to determining that a cache lookup specifying a given address has resulted in a hit in the cache, and that the prefetched indicator is set for the information in the cache associated with the given address, the prefetcher is configured to select the given address as an address to be used to train the prefetcher. Therefore, addresses may be selected to train the prefetcher if they are specified in a cache lookup which hits against an entry providing information that has been prefetched into the cache but has not been accessed since being prefetched.

In some examples, both the redundant prefetch indicator and prefetched indicator may be considered when selecting addresses to train the prefetcher. For example, in response to determining that a cache lookup specifying a given address has resulted in a hit, that the prefetched indicator is not set for the information associated with the given address, and that the redundant prefetch indicator is not set for the information associated with the given address, the prefetcher may be configured to exclude the given address from the addresses to be used to train the prefetcher. Therefore, the prefetcher may not be trained on addresses corresponding to information residing in the cache which has neither been prefetched and not accessed since being prefetched, nor previously specified in a prefetch request that initiated a lookup in the cache resulting in a hit. By omitting such addresses from the training stream, this preserves prefetcher training resources for other addresses more likely to lead to improvement in prefetcher coverage.

In some examples, the prefetcher is configured to train on addresses specified in access requests and/or prefetch requests, when cache lookups performed in response to those requests miss in the cache. By using addresses of cache misses to train the prefetcher, this makes it more likely that those misses can be avoided in future.

The redundant prefetch indicator may also be used in further aspects of the data processing system, as well as the use described above where the redundant prefetch indicator is used for selection of addresses to be used for training the prefetcher.

In one example, the data processing apparatus comprises cache eviction circuitry configured to control eviction of information from the cache. The cache eviction circuitry may use information derived from at least one redundant prefetch indicator to control eviction of information from the cache. In some examples, this can involve determining whether the redundant prefetch indicator associated with a given item of information in the cache is set or not. In other examples, this can involve determining a property of several redundant prefetch indicators, such as calculating a proportion of items in the information in the cache which have a redundant prefetch indicator set and using this information to control eviction of information from the cache.

For example, the cache eviction circuitry may select items of information to evict from the cache. Information may be evicted from the cache in response to receiving a request to write data to the cache when there is no available entry able to be allocated the data to be written, in which case a cache entry may need to be selected for eviction from the cache to make room for the write request. In one example, the selection of which item of information to evict is based at least partially on information derived from a redundant prefetch indicator. The particular way in which the redundant prefetch indicator is considered for selecting items for eviction may vary from one implementation to another, and could be just one factor in a multi-factor selection policy for selecting the item to be evicted. A redundant prefetch indicator may in some situations indicate that the associated information has a greater chance of being used in the future than if no redundant prefetch indicator was set, as it indicates that there has been a prefetch request previously issued for the information when the information already resided in the cache, so the information is predicted to be accessed again in future. However, as will be discussed in greater detail below, the redundant prefetch indicator may also indicate that the associated information is not used as regularly as other information, as it can be associated with information from data structures that have been partially (but not fully) evicted from a cache before they are accessed again, unlike more regularly accessed information structures which might not have been evicted at all before being reused. Hence, the policy for considering the redundant prefetch indicator may be a relatively complex one, that may weigh up multiple factors, but in general it can be useful to use the redundant prefetch indicator as an additional source of information in eviction control, for making more informed decisions on which entry to evict.

Note also that the redundant prefetch indicator associated with a particular address of cached information may be able to provide information useful for deciding whether items of information at other addresses should be evicted, not just the particular address associated with the redundant prefetch indicator. This is because the redundant prefetch indicator may become set for the remaining cached portions of a data structure that has been partially evicted from the cache, but which particular addresses of that data structure remain cached or get evicted may vary randomly, for example depending on which other addresses are specified in access requests. This means that the occurrence of redundant prefetch indicators may provide information about the usage of the data structure as a whole, not just the address which happens to have the redundant prefetch indicator set, and therefore information from a redundant prefetch indicator set for one address could be used in deciding on evictions associated with other addresses.

Hence, it will therefore be seen that according to the specific details of the data processing apparatus, a redundant prefetch indicator may indicate several different properties about cached information, and can be used as part of a decision regarding whether to evict the information from the cache to make the information either a higher or lower priority for eviction.

In some examples, the cache eviction circuitry may select a storage device to which an item of information from the cache is to be evicted. For example, cache eviction circuitry may evict information from the cache to a storage device comprising either a lower level of cache or memory. It may be quicker to retrieve the data from a further level of cache than memory, so information that is more likely to be used in the future may be evicted to the cache instead of memory. In addition, if there are several levels of cache after the evicting cache, it may be quicker to retrieve information from the levels of cache closest to the evicting cache in the hierarchy. The level to which a given item is to be evicted may be selected based on a prediction of how soon that information is likely to be needed again, to try to preserve capacity in the faster-accessible cache levels for information likely to be needed soonest. The cache eviction circuitry may in some examples determine to which storage device information is to be evicted based at least partially on a redundant prefetch indicator. As described above, a redundant prefetch indicator may in different systems indicate different properties of information, in the cache, associated with the redundant prefetch indicator. For example a redundant prefetch indicator may indicate that information in the cache is either more frequently accessed or less frequently accessed than other information. For example, it may indicate that the expected reuse period would be an intermediate time, longer than the expected reuse period for some addresses (due to not being reused soon enough to prevent partial eviction of the data structure) and shorter than the expected reuse period for other addresses (because the redundant prefetch hit indicates that a second use of the same data was able to be predicted by the prefetcher). Therefore, this information can be used by the cache eviction circuitry as part of a decision regarding to which storage device information is to be evicted. For example, if in a particular system a redundant prefetch indicator associated with information in the cache is set, and in the particular system this indicates that the information is less frequently accessed, the cache eviction circuitry may evict this information to a slower to access storage device when the information is selected to be evicted.

In some examples, prefetching parameters of the prefetcher, other than selecting which addresses are to be used to train the prefetcher, may be controlled based at least in part on information derived from the redundant prefetch indicator. For example, the prefetcher may have various parameters that can be varied to prefetch more effectively in a given system at a given time. For example, prefetcher aggressiveness may be a parameter of the prefetcher. More aggressive prefetching is associated with prefetching further ahead of the stream of addresses that the prefetcher receives for training and potentially speculating more about which addresses may be requested in future access request. More aggressive prefetching may be beneficial in some systems, but can also have drawbacks, for example prefetching a large number of addresses that will never be used (by speculating too much) may fill up caches will unnecessary information, causing the eviction of more useful data. More aggressive prefetching may also be associated with higher power use. A redundant prefetch indicator indicates that the associated information in the cache has been specified in a prefetch request while already residing in the cache. In some systems, if more than a certain proportion of entries in the cache are associated with a redundant prefetch indicator, this may indicate that the prefetcher is too aggressive as it is predicting addresses that already reside in the cache, and there may be advantages associated with reducing the prefetcher aggressiveness. Therefore, the aggressiveness of the prefetcher may be varied based on information derived from redundant prefetch indicators.

In some examples, the prefetcher may have an enabled state and a disabled state. In the enabled state, the prefetcher may prefetch information. In the disabled state the prefetcher may not prefetch information. The disabled state may use less power than the enabled state. In some examples, whether or not the prefetcher is enabled could be controlled at least partially based on information derived from a redundant prefetch indicator. For example, the prefetcher may be set to the enabled or disabled state based on a proportion of cache entries that are associated with a redundant prefetch indicator that is set, in a similar way to controlling prefetcher aggressiveness.

In some examples, the prefetcher may allocate training resource to a training address based on the result of a cache lookup. For example, a prefetcher might allow training entries to be reallocated to a training address associated with a cache miss, but not to a training address associated with a cache hit. In some examples, training resource allocation for a given address is a prefetching parameter that may at least partially depend on whether the given address is associated with a redundant prefetch indicator.

In some examples, a prefetcher parameter may comprise a prefetcher arbitration policy. An element of the data processing circuitry, such as the cache lookup circuitry, or of the prefetcher (such as a prefetch request buffer), may have a limited bandwidth regarding the number of prefetch requests that can be handled at any given time. It could be the case that the prefetcher predicts more addresses than can be handled according to this bandwidth. Therefore, the prefetcher may perform arbitration to choose particular predicted addresses for which to issue prefetch requests (from among a candidate set of predicted addresses predicted as potentially useful), and may perform this choice based on an arbitration policy. A choice of arbitration policy could be made based on at least one redundant prefetch indicator. For example, addresses predicted by different prediction mechanisms can have different levels of priority determined based on a proportion of entries in a cache that are associated with a redundant prefetch indicator.

In some examples, a prefetcher parameter may comprise a prefetcher shared usage policy. The prefetcher and access request hardware may use shared resources. For example, a shared buffer may be used to store addresses to be used by the cache lookup circuitry, where the addresses can be associated with prefetch requests or access requests. Also, downstream memory components may be shared for usage between access requests and prefetch requests. The shared usage policy can determine how much of the shared resource the prefetcher is allowed to use. If the prefetcher were to use too much of the shared resource, there may not be enough resource to accommodate the access requests that are received. Redundant prefetch indicators indicate that an address that already resides in the cache has been specified in a prefetch request. In one illustrative example, if more than a given proportion of entries in the cache have a set redundant prefetch indicator, this can indicate that the prefetcher is prefetching too much, and could be an indicator that the shared resource policy could be modified to allow the prefetcher to have access to less shared resource.

In some examples, the data processing apparatus may comprise several levels of cache. When a prefetcher prefetches information from memory or a further level of cache, it may determine which particular cache is the target cache to prefetch information into. In some examples, the determination of a target cache may be based at least in part on information derived from a redundant prefetch indicator. For example, in one instance an information structure can be prefetched into a cache close to the source of access requests, but may be partially evicted. In this case, information in the structure may become associated with redundant prefetch indicators. It may be that in future, it would be more efficient to prefetch the information structure into a slower-to-access level of cache (as it was partially evicted from the faster-to-access level of cache the first time), and this could be determined based on the presence of redundant prefetch indicators associated with the information.

It will be appreciated that there are many different ways to train a prefetcher based on training addresses. However, in one example, the prefetcher may predict future addresses to prefetch based on a stride pattern. For example, the prefetcher may analyse addresses that are selected to train the prefetcher for patterns of addresses separated by a constant stride value. These addresses do not need to be provided to the prefetcher consecutively, but may (in some training schemes) be separated by other training addresses. The level of confidence for a particular stride sequence may increase as more training addresses are observed that fit the stride sequence. The prefetcher may prefetch an address based on a stride sequence that has reached a certain level of confidence by applying the stride value to a received training address to generate an address to be prefetched.

FIG. 1 is a schematic diagram of a data processing apparatus comprising a cache 2 and a prefetcher 3. It will be appreciated that FIG. 1 shows one example of how these components can be configured, and that other configurations are not excluded in the present technique. The cache 2 comprises cache lookup circuitry 4 configured to look up entries in the cache for an entry corresponding to a given address. Although the cache lookup circuitry 4 is shown as part of the cache 2, it will be appreciated that the cache lookup circuitry 4 may be an entirely separate component to the cache 2. The cache 2 may receive an access request from elsewhere in the data processing system, such as from a CPU or an earlier cache in a cache hierarchy, requesting that information corresponding to a particular address is returned. When an access request is received by the cache, the cache lookup circuitry 4 searches the cache for an entry providing information corresponding to the requested address. If the cache lookup results in a hit, the information corresponding to the address is returned as a response to the access request. If the cache lookup results in a miss, the information corresponding to the address may be retrieved from a further level of cache or memory and returned in a response to the access request. The prefetcher 3 is configured to prefetch items of information into the cache in advance of an access request being received for the information. The prefetcher 3 prefetches items of information by predicting an address that will be specified in a future access request, and issuing a prefetch request corresponding to the address. In response to the prefetch request, the cache lookup circuitry 4 looks up the cache 2 to determine whether there is a copy of the information corresponding to the prefetch request already residing in the cache. If the information does not reside in the cache, the prefetcher 3 will prefetch information into the cache from a further level of cache or memory. The prediction of future access requests is based on addresses provided to the prefetcher 3 for training, which are selected based on cache lookups (these can include either cache lookups initiated in response to an access request, cache lookups initiated in response to a prefetch request). It has been found that training a prefetcher using the address specified in every cache lookup leads to a large number of redundant prefetch requests, so a selection of addresses is made to train the prefetcher 3. The selection of addresses can be based on the result of the cache lookups.

Figure 2:
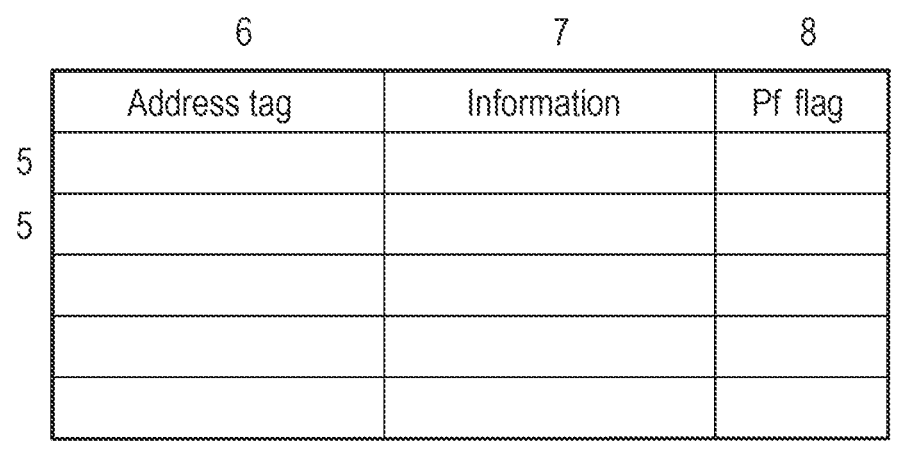

In one technique (discussed to provide understanding of the problem discussed below), entries in the cache may be associated with a prefetched indicator (pf_flag). FIG. 2 shows an example of the information that may be stored in a cache 2 according to this technique. The cache 2 comprises several entries 5. Each entry comprises several fields including an address tag field 6, and information field 7, and a pf_flag field 8. Not shown for ease of illustration, each entry 5 of the cache 2 may also be associated with additional metadata providing information such as replacement policy information (such as how recently the entry was stored in the cache) and coherency state information. The address tag field 6 may be used to store a tag value (e.g. an entire address, or part of an address, or a value derived from the address or part of the address) which can be used by cache lookup circuitry 4 to identify whether an entry 5 in the cache corresponds to a given address for which a cache lookup is performed. The information field 7 comprises the information associated with an address, and may be used to store the data or instructions that are returned in response to an access request. The pf_flag field 8 comprises the pf_flag. The pf_flag is set by cache indicator circuitry 9 (shown in FIG. 1). Although the cache indicator circuitry 9 is shown as part of the cache 2, it will be appreciated that the cache indicator circuitry 9 may be an entirely separate component to the cache 2. The cache indicator circuitry 9 is configured to set the pf_flag for entries in the cache that have been prefetched into the cache 2 by the prefetcher 3. The cache indicator circuitry 9 clears the pf_flag when the cache entry is accessed for the first time after being prefetched. The pf_flag can therefore indicate that the information in a given entry 5 of the cache 2 has been prefetched by the prefetcher 3 and has not been accessed in response to an access request since being prefetched.

In one technique used to select addresses to train the prefetcher 3, addresses are selected to train the prefetcher 3 when they are specified in a cache lookup which either:

hits in the cache 2 against a cache entry 5 that has the pf_flag set, or misses in the cache 2.

However, the inventors have found that this technique can have reduced prefetcher coverage when a data structure is partially evicted from a cache 2.

For example, consider the following situation. The prefetcher 3 predicts a series of addresses to be prefetched at @A, @A+1, @A+2, @A+3, @A+4, @A+5, @A+6, @A+7, @A+8, @A+9. This could be due to a series of access requests that have been received according to the above pattern, for example. Following prefetching, the relevant entries of the cache are shown in Table 1 (the information field has been hidden for ease of illustration).

TABLE 1

| Address tag | Pf_flag |
| --- | --- |
| @A | set |
| @A + 1 | set |
| @A + 2 | set |
| @A + 3 | set |
| @A + 4 | set |
| @A + 5 | set |
| @A + 6 | set |
| @A + 7 | set |
| @A + 8 | set |
| @A + 9 | set |

Following prefetching, the prefetched addresses are specified in access requests (read), and each entry 5 shown in Table 1 in the cache 2 has the pf_flag cleared. Table 2 shows the relevant cache lines following this process.

TABLE 2

| Address tag | Pf_flag |
| --- | --- |
| @A | |
| @A + 1 | |
| @A + 2 | |
| @A + 3 | |

TABLE 2-continued

| Address tag | Pf_flag |
| --- | --- |
| @A + 4 | |
| @A + 5 | |
| @A + 6 | |
| @A + 7 | |
| @A + 8 | |
| @A + 9 | |

Later on, additional information may be stored in the cache and some of the entries 5 shown in Table 2 may be evicted, while other entries of the previously cached data structure remain in the cache, as shown in Table 3.

TABLE 3

| Address tag | Pf_flag |
| --- | --- |
| B | N/A |
| C | N/A |
| D | N/A |
| @A + 3 | |
| @A + 4 | |
| E | N/A |
| F | N/A |
| @A + 7 | |
| G | N/A |
| H | N/A |

The cache now contains some entries of a data structure that do not have the pf_flag set. Of the originally cached data structure @A to @A+9, some parts remain, but there are holes where other parts have been evicted.

At a later time, the program being executed again initiates a series of access requests specifying the same series of addresses, @A, @A+1, @A+2, @A+3, @A+4, @A+5, @A+6, @A+7, @A+8, @A+9. If the prefetcher has detected a +1 stride pattern, the prefetcher could issue prefetch requests for an address determined by applying a +1 stride to a training address. Addresses could be selected as training addresses due to being specified in cache lookups that miss in the cache or hit on a line with the pf_flag set. For example, the access request for @A causes a cache lookup resulting in a miss, and therefore @A is selected as a training address. This might cause a prefetch request to be issued for @A+1 (applying a +1 stride to @A) which will miss in the cache (see Table 3) causing a linefill for @A+1, and when the linefill is finished the data for address @A+1 is allocated into the cache with pf_flag set. Following a subsequent access to the data structure by the program being executed (to address @A+1 as the previous address was @A), this causes a hit on a prefetched line with pf_flag set and therefore @A+1 can be selected as a training address. The same occurs for address @A+2. However, it will be seen that, according to the above described technique, addresses @A+3, @A+4, and @A+7 will not be selected as addresses to train the prefetcher. This is because, as shown in Table 3, these addresses correspond to cache entries (therefore the cache lookup will result in a hit) that do not have the pf_flag set. Therefore, the prefetcher can only receive the following addresses for training:

@A
@A+1
@A+2
@A+5
@A+6
@A+8
@A+9

It can be seen that the strides observed by the prefetcher between the above addresses selected to train the prefetcher are as follows: +1, +1, +3, +1, +2, +1. This clearly does not display the regular +1 stride pattern of the access requests, and is due to the entries @A+3, @A+4, and @A+7 residing in the table without a set pf_flag.

One consequence of this is that the entry corresponding to address @A+5 may not be prefetched, for example. If prefetches are issued based on detection of a +1 stride pattern, then as @A+4 has not been selected to train the prefetcher, there is no prefetch request issued for @A+5. Therefore, in response to the access request for information corresponding to address @A+5, the cache lookup results in a miss, and information corresponding to the address has to be retrieved from a further level of cache or memory at the time of the access request, introducing latency for the @A+5 access request. This cache miss encountered for @A+5 leads to reduced prefetcher coverage as it increases the number of cache misses that have not been avoided due to the prefetcher. A similar problem arises for the miss at address @A+8.

The problem has been described above using a simple stride pattern detection with a constant +1 stride. However, it will be appreciated that this has been chosen for illustration and that there are many more complex prefetching techniques that can also suffer from reduced prefetcher coverage as a result of entries remaining in the cache after partial eviction.

The inventors have recognised that the problem described above can be addressed by selecting addresses to train the prefetcher when a corresponding cache lookup hits in the cache on an entry that has been previously specified in a prefetch request for which the cache lookup also resulted in a hit (in addition to selecting addresses for training on a miss, or on a hit that hits against an entry with the pf_flag set). That is, the proposed technique trains on an address corresponding to information that already resides in the cache, when it is determined that the address has previously been specified in a redundant prefetch request.

In the case of the example given above, the prefetcher can issue a prefetch request for @A+3 when @A+2 is selected to train the prefetcher (a +1 stride is applied to the training address @A+2 to calculate a prefetch address @A+3) for which the cache lookup hits in the cache. This could occur as part of a series of prefetches carried out in response to the first access request specifying address @A. In the previous example, @A+3 was not used to train the prefetcher as a result of the cache lookup hitting against an entry without the pf_flag set. In the present example, @A+3 is also not selected to train the prefetcher in response to the first cache lookup performed in response to a prefetch request, but some information is recorded to indicate that the prefetch request hit against the entry corresponding to @A+3, and so from this point onwards it can be determined that a cache lookup has been performed in response to a prefetch request for @A+3, and that the cache lookup hit in the cache. In some examples, this might involve setting a redundant prefetch indicator at this point, corresponding to the @A+3 cache entry.

This means that according to the present technique, if a future cache lookup is performed for @A+3 (for example, at the point when a subsequent access request triggers a cache lookup or a further series of prefetch requests which may themselves trigger cache lookups), then @A+3 is selected to train the prefetcher.

In one example, the address @A+3 may be selected to train the prefetcher in response to an access request specifying address @A+1 (or @A+2). The first access request, specifying @A, may have caused a series of prefetch requests to be issued as described above for addresses @A+1, @A+2, and @A+3, the last of which hit in the cache and was not selected to train the prefetcher, causing the series of prefetches initiated by the @A access request to come to an end. When the access request is received for address @A+1, this causes a cache lookup which results in a hit on the line @A+1 with the pf_flag set. Therefore, address @A+1 is selected to train the prefetcher, starting another series of prefetch requests. The prefetch request issued for @A+3 as part of the series will cause a cache lookup, which will hit against the @A+3 entry, and it can be determined that a previous cache lookup performed in response to a prefetch request also hit against this entry (for example by checking the status of the redundant prefetch indicator), and therefore in this case address @A+3 is selected to train the prefetcher.

In another example, an access request is received for @A+3. This access request causes a cache lookup that results in a hit against an entry for which a previous cache lookup performed in response to a prefetch request also hit, and therefore in the example address @A+3 can also be selected to train the prefetcher.

The above examples are merely provided for illustration and cover only two of the possible situations leading to a cache lookup specifying @A+3. Hence, the address @A+3 is selected to train the prefetcher where it could not be selected according to the alternative technique described above. This technique also allows @A+4 and @A+7 to be selected as addresses to train the prefetcher in a similar manner. Therefore, as @A+4 is selected to train the prefetcher, a cache entry corresponding to @A+5 is prefetched into the cache in advance of receiving the access request for @A+5, and therefore the previously described latency associated with retrieving @A+5 from a further level of cache or memory in response to an access request is eliminated or reduced because it is incurred at the time of the prefetch request and so at least part of that latency is eliminated from the subsequent access request issued for @A+5. Similarly, the miss for @A+8 can also be avoided.

In summary, applying the proposed technique to the example given above, the series of addresses selected to train the prefetcher is as follows:

@A
@A+1
@A+2
@A+3
@A+4
@A+5
@A+6
@A+7
@A+8
@A+9

It can be seen that the strides observed by the prefetcher between the addresses selected to train the prefetcher are all equal to +1. Using these training addresses, cache misses can be avoided for access requests to addresses @A+5 and @A+8, and therefore prefetcher coverage is improved.

The proposed technique can therefore provide effective selection of prefetcher training addresses, while avoiding the problems associated with partially evicted data structures residing in the cache 2.

The prefetcher 3 may determine that a cache lookup previously performed in response to a prefetch request issued by the prefetcher for the given address resulted in a hit in several different ways. In one example, the cache indicator circuitry 9 is configured to set a redundant prefetch indicator for information in the cache associated with an address for which a cache lookup performed in response to a prefetch request issued by the prefetcher results in a hit. FIG. 3 shows an example of the information that may be stored in a cache 2 according to this technique. FIG. 3 is similar to FIG. 2, but includes an addition redundant prefetch indicator field 10. This field comprises an indicator, which when set indicates that the cache entry 5 corresponding to the indicator has been specified in a prefetch request that has hit in the cache. When determining whether to select an address to train the prefetcher, the prefetcher may refer to the redundant prefetch indicator field 10 corresponding to an entry 5 for which a cache lookup has hit, and if the redundant prefetch indicator is set, then the prefetcher 3 selects the address to train the prefetcher 3.

Figure 4:
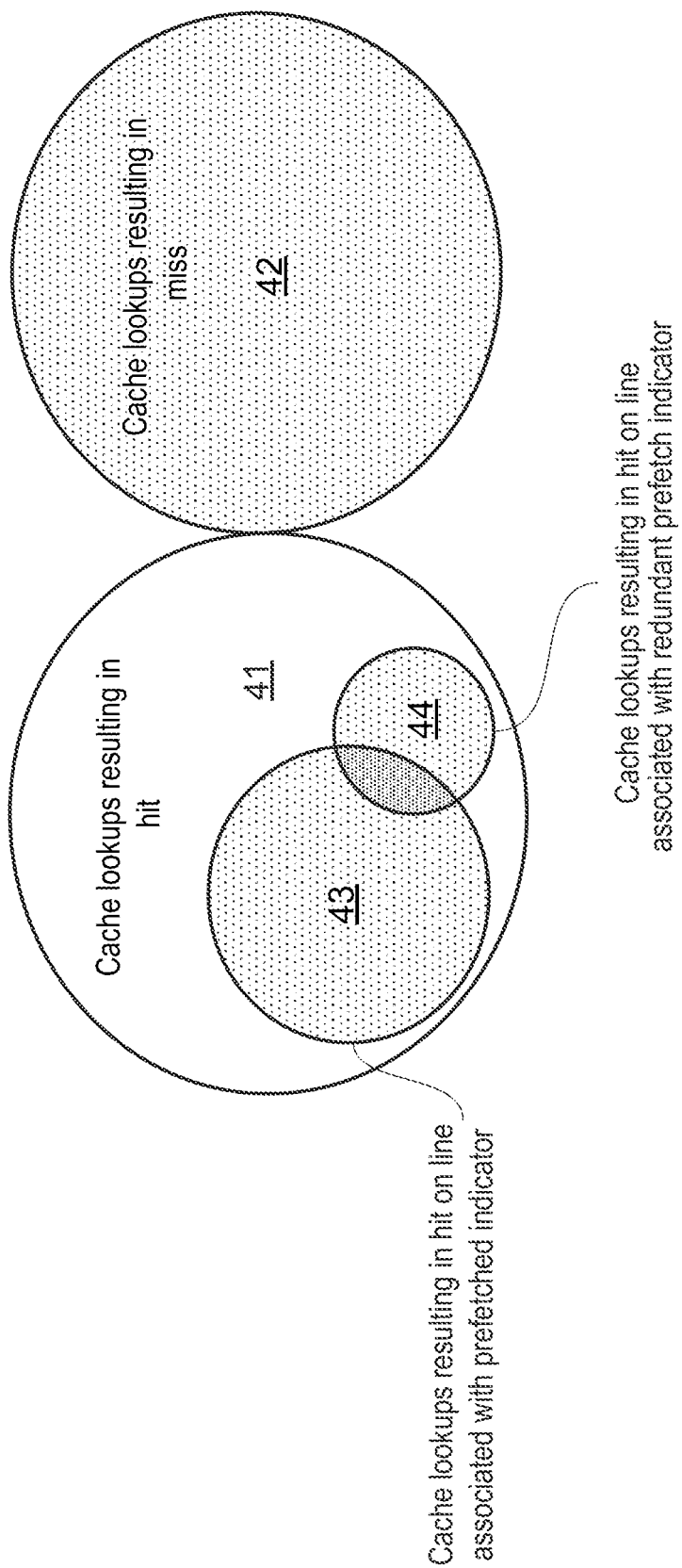
FIG. 4 illustrates a diagram describing potential results of a cache lookup.

FIG. 4 illustrates a diagram showing potential results of a cache lookup. It will be appreciated that a cache lookup can either miss 42 or hit 41 in the cache 2. When the cache lookup results in a hit 41, the cache entry may be associated with either, both, or neither of a pf_flag and a redundant prefetched indicator. In examples of the proposed technique using the redundant prefetch indicator, an address is chosen to train the prefetcher when it belongs to the part of the diagram labelled "cache lookups resulting in hit on line associated with redundant prefetch indicator" 44. In the example described above regarding the address sequence @A to @A+9, addresses were selected to train the prefetcher when they corresponded to the shaded regions 42, 43, and 44 of FIG. 4.

Figure 5:
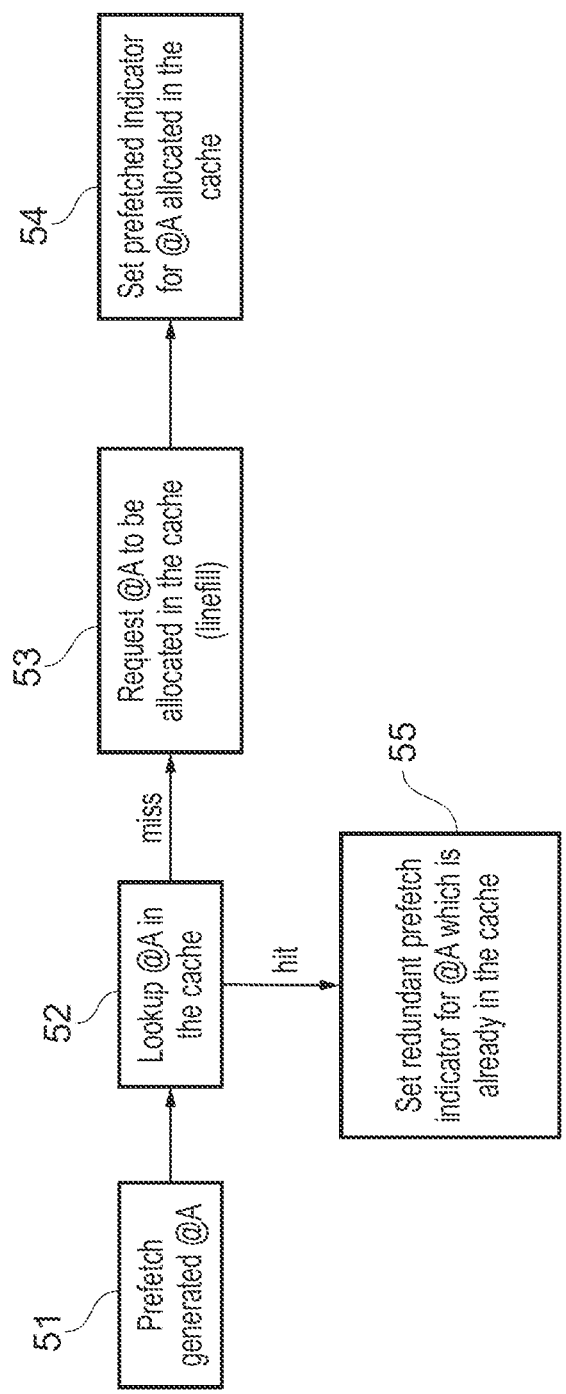
FIG. 5 illustrates a method carried out in response to a prefetch request.

FIG. 5 illustrates a method of using cache indicator circuitry 9 to set the prefetched indicator (pf_flag) and redundant prefetch indicator in the cache 2. At step 51, a prefetch request is issued by the prefetcher 3 for an address @A (@A has no relation to the examples given earlier). At step 52, cache lookup circuitry 4 performs a lookup in cache 2 for an entry 5 corresponding to address @A. When it is determined that information corresponding to address @A does not reside in the cache 2, the cache lookup has missed in the cache 2, and the method proceeds to step 53. At step 53, an entry 5 corresponding to address @A is allocated in the cache 2 and information corresponding to address @A is requested from a further level of cache or memory. At step 54, cache indicator circuitry 9 sets the prefetched indicator (pf_flag) in the pf_flag field 8 of the allocated entry 5, indicating that the entry has been prefetched and has not been accessed since being prefetched. If at step 52 it is instead determined that information corresponding to address @A does reside in the cache 2, the cache lookup has hit in the cache 2, and the method proceeds to step 55. In this case it is unnecessary to allocate an entry 5 or request data corresponding to the address from a further level cache or memory. When the cache lookup, issued in response to a prefetch request, hits in the cache 2 then the cache indicator circuitry 9 sets a redundant prefetch indicator in the redundant prefetch indicator field 10 of the corresponding cache entry 5.

Figure 6:
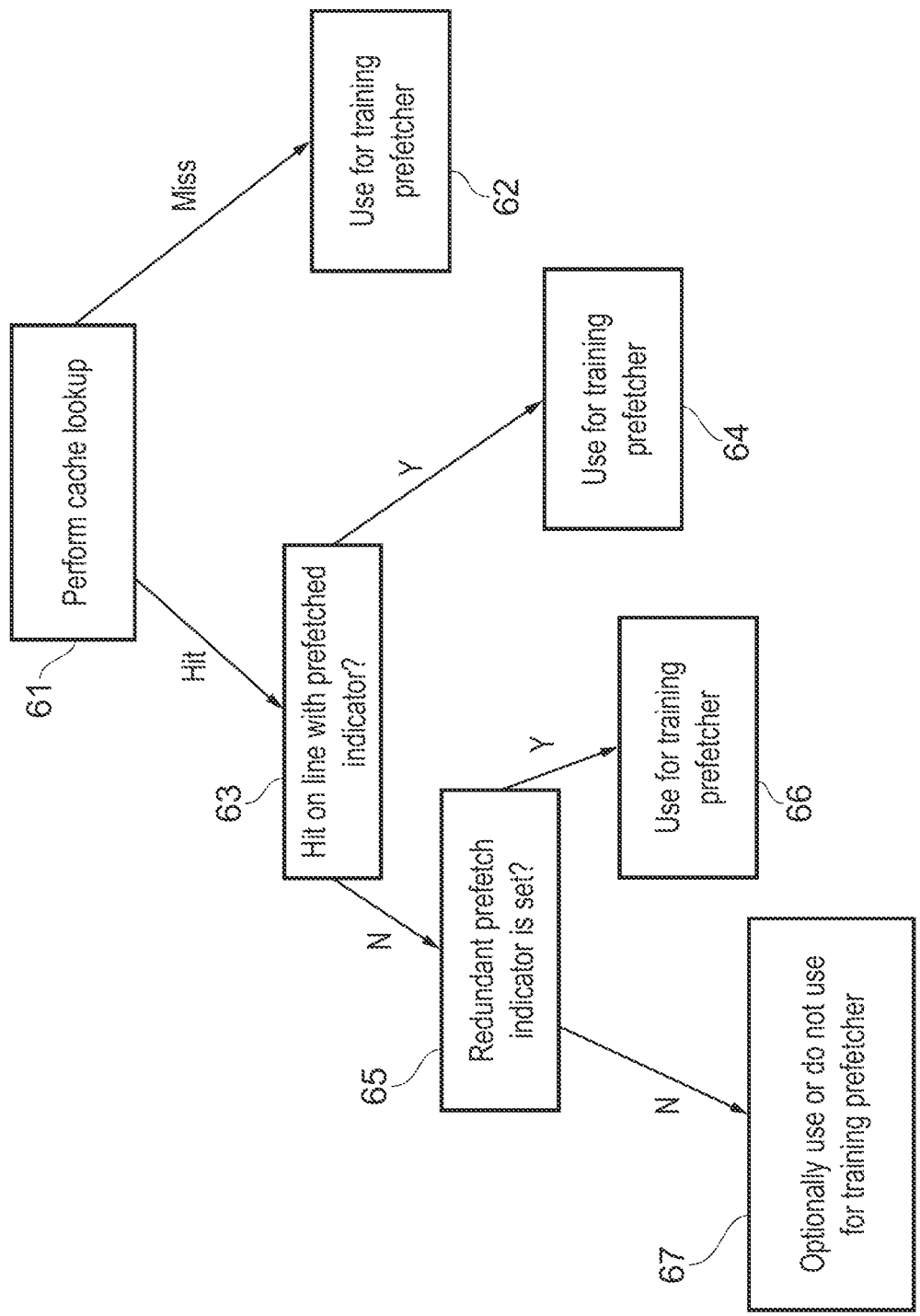
FIG. 6 illustrates a method of selecting addresses to train a prefetcher.

FIG. 6 illustrates a method of selecting addresses to use to train the prefetcher according to an example of the present technique. The ordering of steps in this method is not important, and for example the determinations made in steps 62, 63, and 65 can take place in any order. In addition, steps 63, 64, and 62 may be excluded from examples of the present technique. At step 61, the cache lookup circuitry 4 performs a cache lookup specifying an address @B (@B has no relation to the examples given earlier). If it is determined that information corresponding to address @B does not reside in the cache, the method proceeds to step 62 where address @B is selected to train the prefetcher. If instead it is determined that information corresponding to address @B does reside in the cache, the method proceeds to step 63, where it is determined whether the cache entry 5 corresponding to address @B has a prefetched indicator 8 set. If it is determined that the cache entry 5 does have a prefetched indicator 8 set, then the method proceeds to step 64 where address @B is selected to train the prefetcher 3. If it is determined that the cache entry corresponding to address @B does not have the prefetched indicator 8 set, the method proceeds to step 65, where it is determined whether the cache entry 5 corresponding to address @B has a redundant prefetch indicator 10 set. If it is determined that the cache entry does have a redundant prefetch indicator 10 set, then the method proceeds to step 66 where address @B is selected to train the prefetcher 3. If it is determined that the cache entry corresponding to address @B does not have the redundant prefetch indicator 10 set, the method proceeds to step 67. At step 67, the address @B may be excluded from the addresses selected to train the prefetcher 3. Alternatively, in some examples the address @B may be selected anyway to train the prefetcher 3 (e.g. if it meets some other condition being applied for selecting addresses for training, which may depend on the specific prefetcher implementation).

Figure 7:
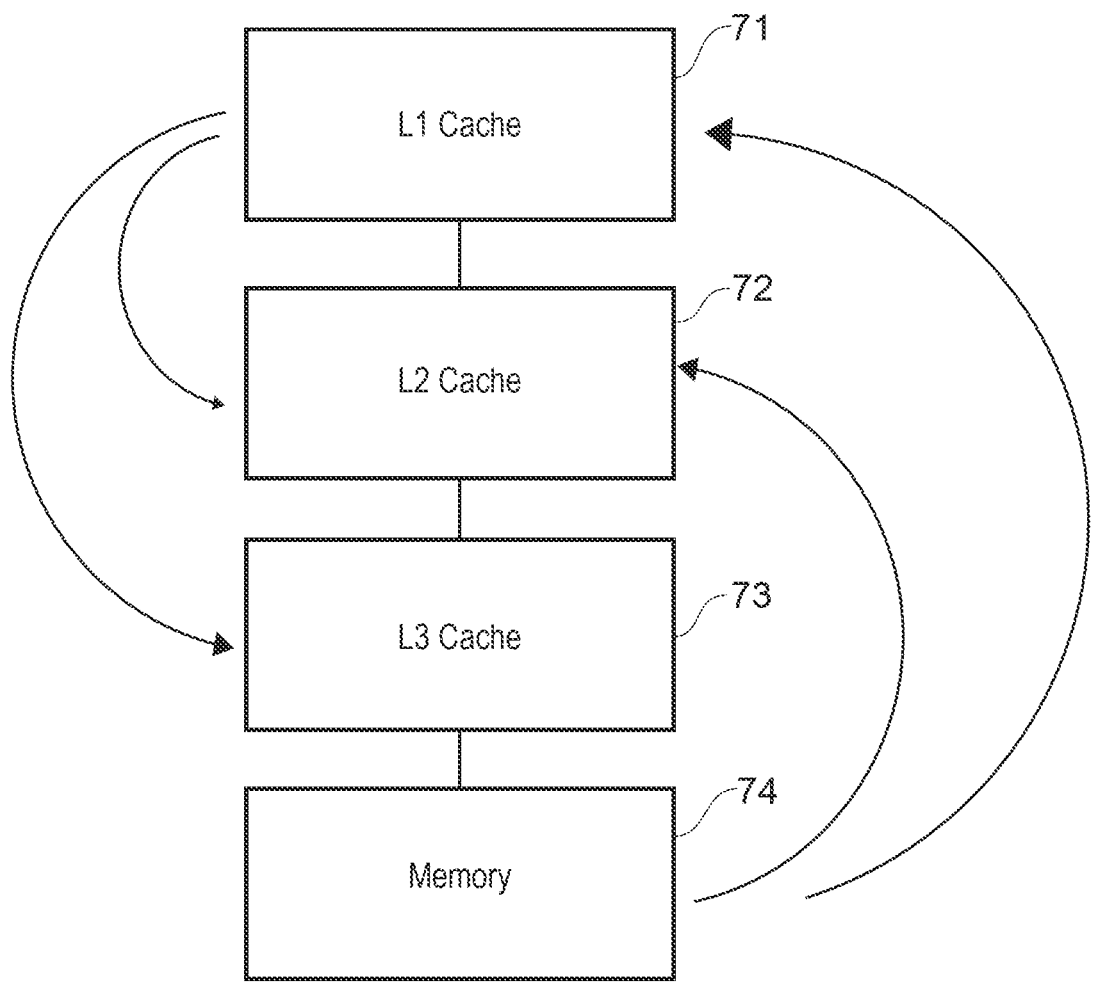
FIG. 7 illustrates a schematic diagram of several levels of a cache hierarchy and a memory component.

The redundant prefetch indicator may also be used in further aspects of the data processing system. Some of these are described with reference to FIG. 7, which illustrates a cache hierarchy comprising a level 1 cache 71, level 2 cache 72 and level 3 cache 73 in addition to a memory 74. The arrows in FIG. 7 illustrate a few example cache evictions and prefetches that may take place. For example, an arrow from memory 74 to L1 cache 71 indicates the prefetching of information from memory to the L1 cache.

In one example, the data processing apparatus comprises cache eviction circuitry 11 (shown in FIG. 1) configured to control eviction of information from the cache 2. The cache eviction circuitry may use information derived from at least one redundant prefetch indicator in order to control eviction of information from the cache. In some examples, this can involve determining whether the redundant prefetch indicator associated with a given entry 5 in the cache 2 is set or not. In other examples, this can involve determining a property of several redundant prefetch indicators, such as calculating a proportion of entries 5 in the cache 2 which have a redundant prefetch indicator set and using this information to control eviction of information from the cache.

For example, the cache eviction circuitry may select items of information to evict from the cache 2. In FIG. 7, the cache 2 may correspond to any level of cache 71, 72, 73. In one example, the selection of which entry 5 to evict is based at least partially on information derived from a redundant prefetch indicator.

In some examples, the cache eviction circuitry 11 may select a storage device to which an item of information from the cache is to be evicted. For example, cache eviction circuitry may evict information from the cache 2 to a storage device comprising either a level of cache 72, 73 further from a requesting device, or memory 74. It may be quicker to retrieve the data from cache 72, 73 than memory 74, so information that is more likely to be used in the future may be evicted to the cache 72, 73 instead of memory 74. In addition, if there are several levels of cache between the evicting cache 71 and memory 74, it may be quicker to retrieve information from a cache closer in the hierarchy to the evicting cache 71 (e.g. 72 as opposed to 73). The cache eviction circuitry 11 may in some examples determine to which storage device information is to be evicted based at least partially on a redundant prefetch indicator. As described above, a redundant prefetch indicator may in different systems indicate different properties of information, in the cache 2, associated with the redundant prefetch indicator. For example a redundant prefetch indicator may indicate that information in the cache 2 is more frequently accessed or less frequently accessed. In either case, this information can be used by the cache eviction circuitry as part of a decision regarding to which storage device information is to be evicted. For example, if in a particular system a redundant prefetch indicator associated with an entry 5 in the cache 2 is set, and if in the particular system this indicates that the information is less frequently accessed, the cache eviction circuitry may evict this information to a slower to access storage device when the information is selected to be evicted.

In FIG. 7, the data processing apparatus comprises several levels of cache. When a prefetcher 3 prefetches information from memory 74 or a given level of cache into another level cache, it may determine which particular cache to prefetch information into. In some examples, the determination of a target cache may be based at least in part on information derived from a redundant prefetch indicator. For example, in one instance an information structure can be prefetched into a high level cache, but may be partially evicted. In this case, information in the structure may become associated with redundant prefetch indicators. It may be that in future, it would be more efficient to prefetch the information structure into a lower level of cache such as by prefetching into the L2 cache 72 as opposed to the L1 cache 71 (as it was partially evicted from the higher level of cache the first time), and this could be determined based on the value of the redundant prefetch indicators 10 associated with the information.

Figure 8:
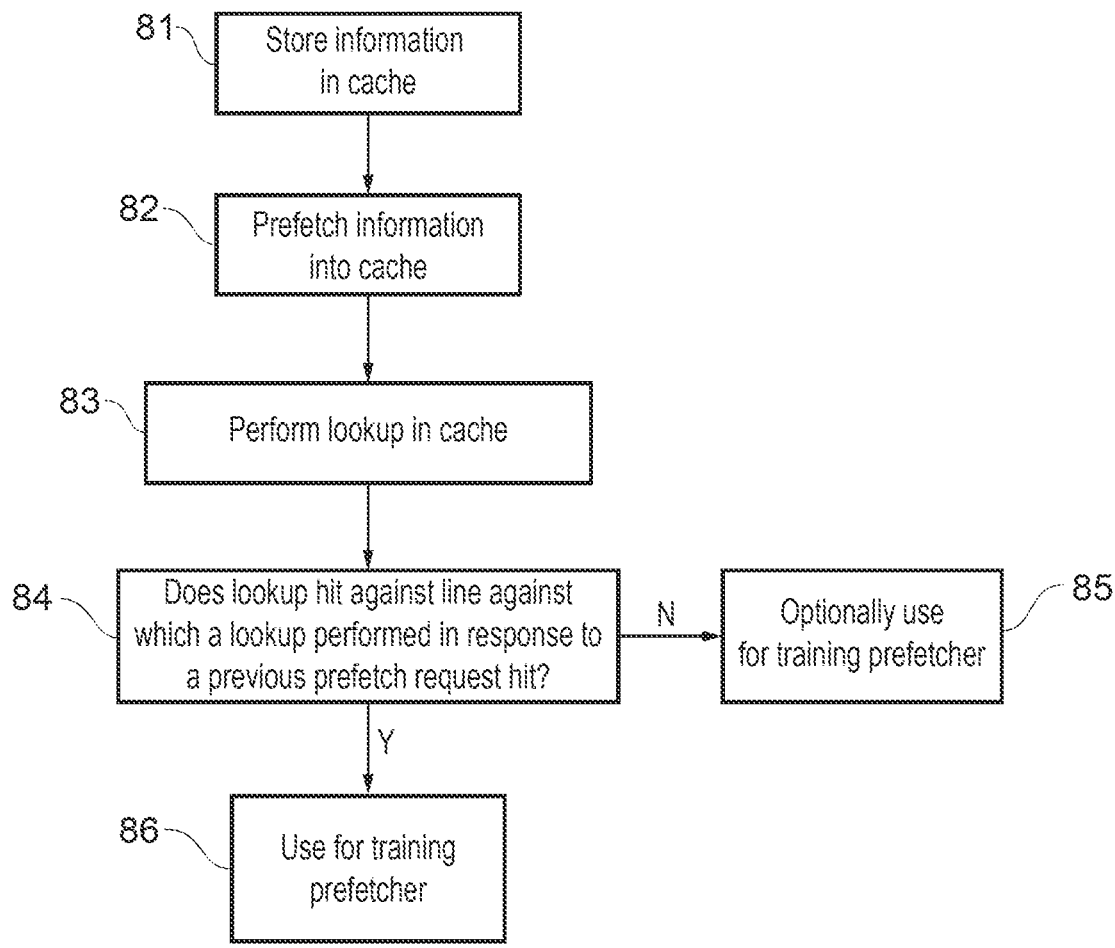
FIG. 8 illustrates a method of operating a system including a prefetcher.

FIG. 8 illustrates an example method of operating an apparatus according to the present technique. The particular order of steps 81, 82, and 83 in this method is not important. At step 81, information is stored in a cache 2. At step 82, information is prefetched into the cache 2 using a prefetcher 3. At step 83 a cache lookup specifying an address is performed. The cache is looked up to determine whether the address corresponds to information that resides in the cache. If it is found at step 84 that the cache lookup resulted in a hit, and that a cache lookup previously performed in response to a prefetch request issued by the prefetcher for the given address resulted in a hit, the method proceeds to step 86 where the address specified in the access request is selected to train the prefetcher. If instead it is found at step 84 that the cache lookup resulted in a miss, or resulted in a hit against a line for which there has not been a cache lookup previously performed in response to a prefetch request issued by the prefetcher for the given address resulting in a hit, the method proceeds to step 85 where the address specified in the access request is optionally selected for training the prefetcher.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may embody computer-readable representations of one or more netlists. The one or more netlists may be generated by applying one or more logic synthesis processes to an RTL representation. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. An apparatus, comprising:
a cache configured to store information, items of information in the cache associated with addresses;
cache lookup circuitry configured to perform lookups in the cache; and
a prefetcher configured to prefetch items of information into the cache in advance of an access request being received for said items of information,
wherein the prefetcher is configured to select addresses to train the prefetcher, and
in response to determining that both:
a given cache lookup specifying a given address has resulted in a hit, and
a previous cache lookup for the given address previously performed before the given cache lookup in response to a prefetch request issued by the prefetcher resulted in a hit,
the prefetcher is configured to select the given address as an address to be used to train the prefetcher.

2. The apparatus according to claim 1, comprising cache indicator circuitry configured to set a redundant prefetch indicator for information in the cache associated with an address for which a cache lookup performed in response to a prefetch request issued by the prefetcher results in a hit,
wherein the prefetcher is configured to determine whether a cache lookup previously performed in response to a prefetch request for the given address resulted in a hit based on a redundant prefetch indicator.

3. The apparatus according to claim 2, wherein the redundant prefetch indicator comprises a flag.

4. An apparatus, comprising:
a cache configured to store information, items of information in the cache associated with addresses;
cache lookup circuitry configured to perform lookups in the cache; and
a prefetcher configured to prefetch items of information into the cache in advance of an access request being received for said items of information,
wherein the prefetcher is configured to select addresses to train the prefetcher, and
in response to determining that a cache lookup specifying a given address has resulted in a hit and determining that a cache lookup previously performed in response to a prefetch request issued by the prefetcher for the given address resulted in a hit, the prefetcher is configured to select the given address as an address to be used to train the prefetcher,
wherein the apparatus comprises cache indicator circuitry configured to set a redundant prefetch indicator for information in the cache associated with an address for which a cache lookup performed in response to a prefetch request issued by the prefetcher results in a hit,
wherein the prefetcher is configured to determine whether a cache lookup previously performed in response to a prefetch request for the given address resulted in a hit based on a redundant prefetch indicator;
wherein the cache indicator circuitry is configured to set a prefetched indicator for information in the cache that has been prefetched by the prefetcher and has not been accessed in response to an access request since being prefetched;
wherein the redundant prefetch indicator is independent from the prefetched indicator.

5. The apparatus according to claim 4, wherein in response to determining that the cache lookup specifying the given address has resulted in a hit and that the prefetched indicator is set for the information associated with the given address, the prefetcher is configured to select the given address as an address to be used to train the prefetcher.

6. The apparatus according to claim 4, wherein in response to determining that the cache lookup specifying the given address has resulted in a hit, that the prefetched indicator is not set for the information associated with the given address, and that the redundant prefetch indicator is not set for the information associated with the given address, the prefetcher is configured to exclude the given address from the addresses to be used to train the prefetcher.

7. The apparatus according to claim 2, comprising cache eviction circuitry configured to control eviction of information from the cache,
  wherein the cache eviction circuitry controls eviction of information from the cache at least partially based on information derived from the redundant prefetch indicator.

8. The apparatus according to claim 7, wherein the cache eviction circuitry controls eviction of information from the cache by selecting an item of information to evict based at least partially on the information derived from the redundant prefetch indicator.

9. The apparatus according to claim 7, wherein the cache eviction circuitry controls eviction of information from the cache by selecting a storage device to which an item of information is to be evicted, based at least partially on the information derived from the redundant prefetch indicator.

10. The apparatus according to claim 7, wherein the prefetcher controls prefetching parameters of the prefetcher, other than selecting which addresses are to be used to train the prefetcher, at least partially based on information derived from the redundant prefetch indicator.

11. The apparatus according to claim 10, wherein the prefetching parameters comprise at least one of:

prefetcher aggressiveness;
whether or not the prefetcher is enabled;
prefetcher training resource allocation;
prefetcher arbitration policy; and
prefetcher shared resources usage policy.

12. The apparatus according to claim 2, wherein the prefetcher determines a target cache into which the prefetcher is to prefetch items of information, at least partially based on information derived from the redundant prefetch indicator.

13. The apparatus according to claim 1, wherein in response to determining that the given cache lookup specifying the given address has resulted in a miss, the prefetcher is configured to select the given address as an address to be used to train the prefetcher.

14. The apparatus according to claim 1, wherein the prefetcher is configured to prefetch an item of information corresponding to an address determined by applying a stride to an address used to train the prefetcher.

15. A non-transitory computer-readable medium to store computer-readable code for fabrication of an apparatus comprising:
  a cache configured to store information, items of information in the cache associated with addresses;
  cache lookup circuitry configured to perform lookups in the cache;
  a prefetcher configured to prefetch items of information into the cache in advance of an access request being received for said items of information,
  wherein the prefetcher is configured to select addresses to train the prefetcher, and
  in response to determining that both:
  a given cache lookup specifying a given address has resulted in a hit, and
  a previous cache lookup for the given address previously performed before the given cache lookup in response to a prefetch request issued by the prefetcher resulted in a hit,
  the prefetcher is configured to select the given address as an address to be used to train the prefetcher.

* * * * *